United States Patent
Slattery

(10) Patent No.: US 8,996,777 B2
(45) Date of Patent: Mar. 31, 2015

(54) MOBILE DEVICE DOCK

(71) Applicants: Volkswagen AG, Wolfsburg (DE); Audi AG, Ingolstadt (DE)

(72) Inventor: Ethan Slattery, Brisbane, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 357 days.

(21) Appl. No.: 13/715,092

(22) Filed: Dec. 14, 2012

(65) Prior Publication Data

US 2014/0173155 A1 Jun. 19, 2014

(51) Int. Cl.
*G06F 1/16* (2006.01)
*G06F 13/40* (2006.01)

(52) U.S. Cl.
CPC .... *G06F 13/4081* (2013.01); *G06F 2200/1637* (2013.01); *G06F 1/1632* (2013.01)
USPC .......................................... 710/303

(58) Field of Classification Search
CPC ................ G06F 1/1626; G06F 1/1632; G06F 2200/1636; G06F 2200/1637; G06F 3/0346; F16M 11/06; F16M 11/08; F16M 11/10; F16M 11/12; G01P 15/08
USPC ........... 710/303; 361/679.43, 679.44, 679.55, 361/679.56, 679.58, 679.59
See application file for complete search history.

(56) References Cited

U.S. PATENT DOCUMENTS

| | | | |
|---|---|---|---|
| 6,196,850 B1* | 3/2001 | Dietz et al. | 439/17 |
| 6,622,083 B1* | 9/2003 | Knockheart et al. | 701/533 |
| 7,117,286 B2 | 10/2006 | Falcon | |
| 2006/0061545 A1* | 3/2006 | Hughes et al. | 345/156 |
| 2009/0307633 A1* | 12/2009 | Haughay et al. | 715/841 |
| 2012/0021808 A1 | 1/2012 | Tseng | |

* cited by examiner

*Primary Examiner* — Glenn A Auve
(74) *Attorney, Agent, or Firm* — Barnes & Thornburg LLP

(57) ABSTRACT

A transportation system includes a passenger vehicle, a mobile device, and a mobile device dock that couples the mobile device to the passenger vehicle. The mobile device dock includes a base coupled to the passenger vehicle and a cradle configured to receive the mobile device. The cradle is coupled to the base to move relative to the base.

44 Claims, 7 Drawing Sheets

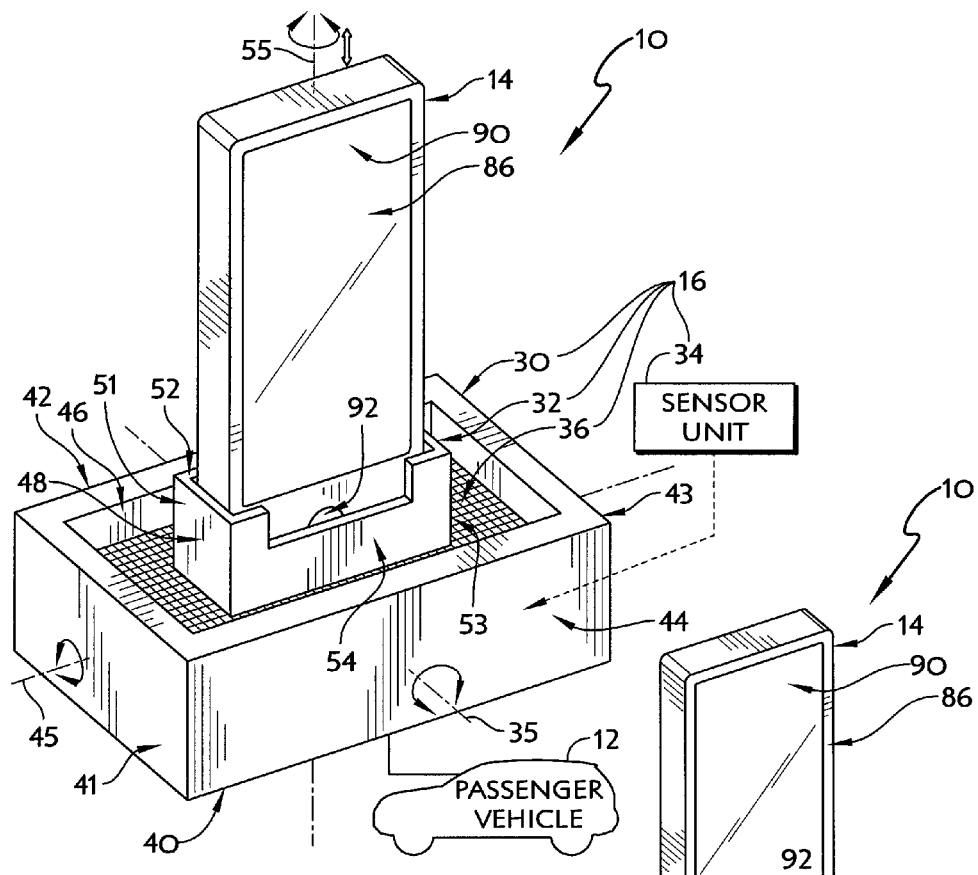
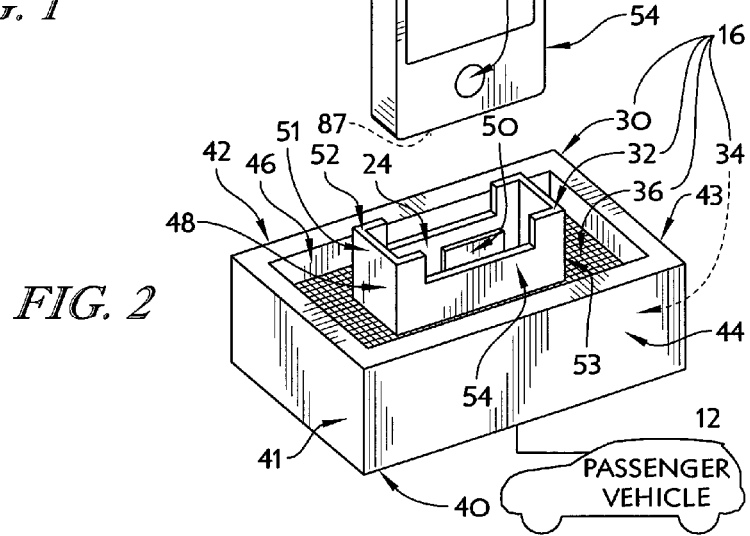

MOBILE DEVICE DOCK

BACKGROUND

The present disclosure relates to a mobile device dock including a cradle forming a compartment sized to receive a mobile device such as a phone, a music player, a tablet computer, or the like. In particular, the present disclosure is directed to a mobile device dock configured to couple a mobile device to a passenger vehicle to form a transportation system. The mobile device dock may couple a mobile device to other pieces of equipment to form other systems.

SUMMARY

According to the present disclosure, a mobile device dock includes a base and a cradle coupled to the base for movement relative to the base. The cradle is formed to include a compartment sized to receive a mobile device. The cradle illustratively moves relative to the base in response to a user applying an input force to a mobile device received in the cradle.

In illustrative embodiments, the mobile device dock includes a sensor unit configured to detect movement of the cradle relative to the base from a home position to a plurality of input positions and to generate signals in response to movement of the cradle to the input positions. The sensor unit is illustratively configured send the signals to the mobile device received in the cradle so that a user can control the mobile device by moving the mobile device (along with the cradle) relative to the base.

In illustrative embodiments, the mobile device includes an elastic bias member coupled to the base and to the cradle. The elastic bias member creates a haptic feedback force that opposes movement of the cradle relative to the base. The haptic feedback force is felt by a user moving the cradle from the home position to one of the input positions by applying an input force to the mobile device. The elastic bias member also returns the cradle back to the home position from the input position when the user releases the mobile device.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 1 is a partially-diagrammatic perspective view of a transportation system showing that the transportation system includes a passenger vehicle, a mobile device, and a mobile device dock adapted to be mounted in the passenger vehicle to couple the mobile device to the passenger vehicle, and showing that the mobile device dock includes a base coupled to the passenger vehicle, a cradle sized to receive the mobile device, a sensor unit housed in the base to detect movement of the cradle relative to the base, and an elastic bias member coupled to the base and to the cradle to return the cradle to a home position after movement of the mobile device and the cradle by a user and to provide haptic feedback to a user moving the mobile device and the cradle relative to the base as suggested in FIGS. 3-6;

FIG. 2 is a view similar to FIG. 1 showing the mobile device removed from the mobile device dock, and showing that the cradle includes a connector for providing data and power connections between the mobile device and the mobile device dock;

DETAILED DESCRIPTION

Figure 3:
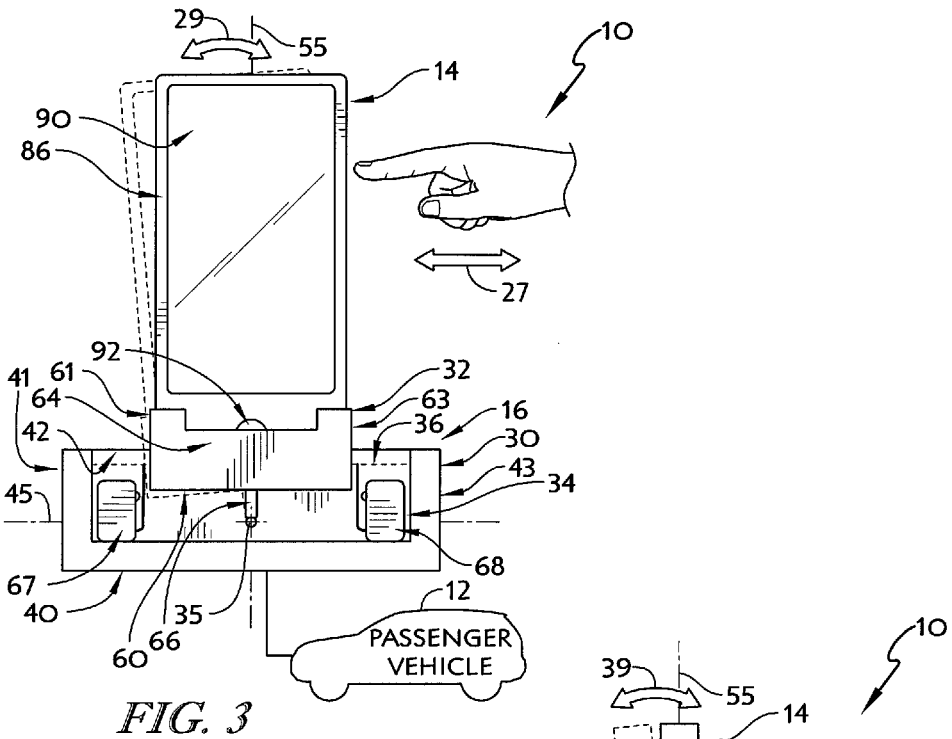
FIG. 3 is a partially-diagrammatic front elevation view of the transportation system of FIGS. 1 and 2 cut away to show that the sensor unit includes sensors configured to detect movement of the cradle about an x-axis in response to a user tapping the mobile device.

According to the present disclosure, a mobile device dock 16 includes a base 30 and a cradle 32 coupled to the base 30 for movement relative to the base 30 as suggested in FIGS. 1-6. The cradle 32 is formed to include a compartment 24 sized to receive a mobile device 14 as shown in FIG. 2. The cradle 32 illustratively moves relative to the base 30 in response to a user applying an input force to the mobile device 14 received in the cradle 32 as suggested in FIGS. 3-6.

An illustrative transportation system 10 using the mobile device dock 16 may also include a passenger vehicle 12 and a mobile device 14 as shown in FIG. 1. The illustrative transportation system 10 includes the mobile device dock 16. The passenger vehicle 12 includes a number of auxiliary systems 77, 78, 79 (shown in FIG. 7) that receive inputs from the mobile device 14 so that the auxiliary systems 77, 78, 79 are controlled, at least in part, by the mobile device 14. For example, an entertainment system 77 of the passenger vehicle 12 may receive a music track to be played from the mobile device 14. The mobile device 14 includes a user interface 86 with a touch-screen display 90 that provides touch-sensitive means for controlling the mobile device 14 by touching icons and text displayed on the touch-screen display 90. The mobile device dock 16 couples the mobile device 14 to the passenger vehicle 12, as shown in FIG. 1, and provides means for controlling the mobile device by tapping or pushing the entire mobile device 14 as suggested in FIGS. 3-6.

A user can interact with the mobile device 14 of the transportation system 10 by tapping or pressing the mobile device 14 so that the mobile device moves in the mobile device dock 16 as suggested in FIGS. 3-6. More specifically, the mobile device dock 16 detects movement of the mobile device 14 while the mobile device 14 is received in the mobile device dock 16 and provides an input signal to the mobile device 14. The input received by the mobile device 14 allows a user to, for example, change the music track being sent from the mobile device 14 to the passenger vehicle 12 or to control other functions of the mobile device 14.

After each tap or press moves the mobile device 14 and causes the mobile device dock 16 to send a signal to the mobile device 14, the mobile device 14 is returned to a home position by the mobile device dock 16. To return the mobile device 14 to the home position, the mobile device dock 16 creates a force that opposes motion of the mobile device 14 away from the home position. Therefore, a user tapping or pushing the mobile device 14 feels the force opposing motion of the mobile device while moving the mobile device 14 away from the home position providing haptic feedback to a user. For this reason, the force created by the mobile device dock 16 is sometimes called a haptic feedback force.

The mobile device dock 16 illustratively includes the base 30, the cradle 32, a sensor unit 34, and a bias member 36 as shown in FIG. 1. The base 30 is coupled to the passenger vehicle 12. The cradle 32 forms a compartment 24 sized to receive the mobile device 14 and is coupled to the base 30 for movement relative to the base 30 from the home position to a plurality of input positions as suggested in FIGS. 3-6. The sensor unit 34 is illustratively coupled to the base 30 and is configured to detect movement of the cradle 32 relative to the base 30 to send an input signal to the mobile device 14 in response to movement of the cradle 32 to one of the input positions. The bias member 36 is coupled to the base 30 and to the cradle 32 and is configured to move the cradle 14 back to a home position after the cradle 32 has been moved relative to the base 30 and to develop the haptic feedback force that is felt by a user tapping or pressing the mobile device 14 and that moves the cradle 32 back to the home position after the user releases the mobile device 14.

The base 30 may be integrated into the passenger vehicle 12 during original manufacture or may be coupled to the passenger vehicle 12 as part of an aftermarket mobile device dock 16 by adhesives, suction cups, or the like (not shown). The base 30 illustratively includes a floor 40 and side walls 41, 42, 43, 44 that cooperate to form a base cavity 46. The cradle 32 is received partially in the base cavity 46 as shown in FIG. 1.

Figure 5:
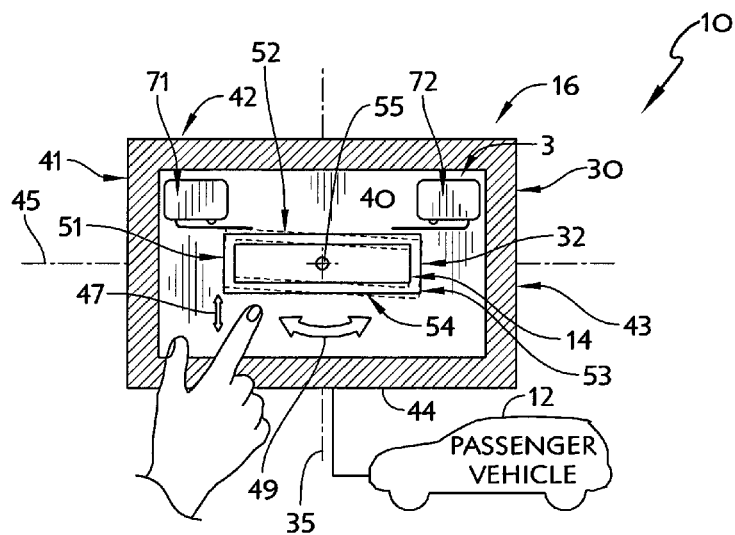
FIG. 5 is a partially diagrammatic top plan view similar to FIGS. 3 and 4 cut away to show that the sensor unit includes sensors configured to detect movement of the cradle about a z-axis in response to a user tapping the mobile device.
Figure 6:
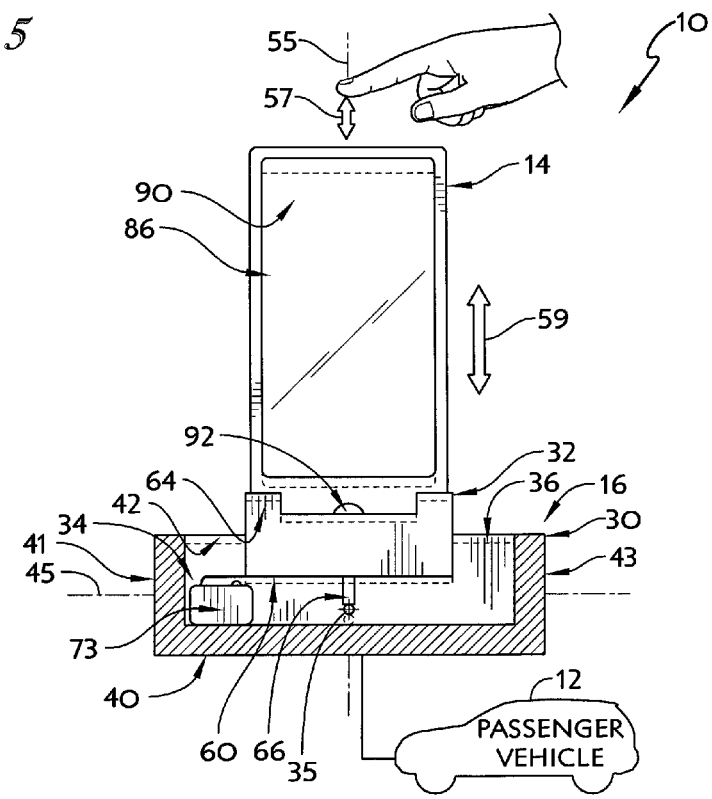
FIG. 6 is a view similar to FIG. 3 cut away to show that the sensor unit includes a sensor configured to detect translation of the cradle along the z-axis in response to a user pushing downwardly on the mobile device.

The cradle 32 is configured to receive and couple to the mobile device 14 as shown in FIGS. 1 and 2. The cradle 32 receives the mobile device 14 and is coupled to the base 30 to pivot relative to the base 30 about an x-axis 35, a y-axis 45, and a z-axis 55 as shown, for example, in FIGS. 3-5. The cradle 32 is also coupled to the base 30 to slide relative to the base 30 along the z-axis 55 as shown in FIG. 6. Each of the axes 35, 45, 55 is orthogonal to and intersects with each of the other axes 35, 45, 55 as shown in FIG. 1. In the illustrative embodiment, the x-axis 35, the y-axis 45, and the z-axis 55 extend through the base cavity 46 and intersect one another at a single point inside the base cavity 46 as shown in FIG. 1. The x-axis 35 and the y-axis 45 are located below the compartment 24 of the cradle 32. The z-axis extends along a longitudinal axis of the mobile device 14.

Figure 7:
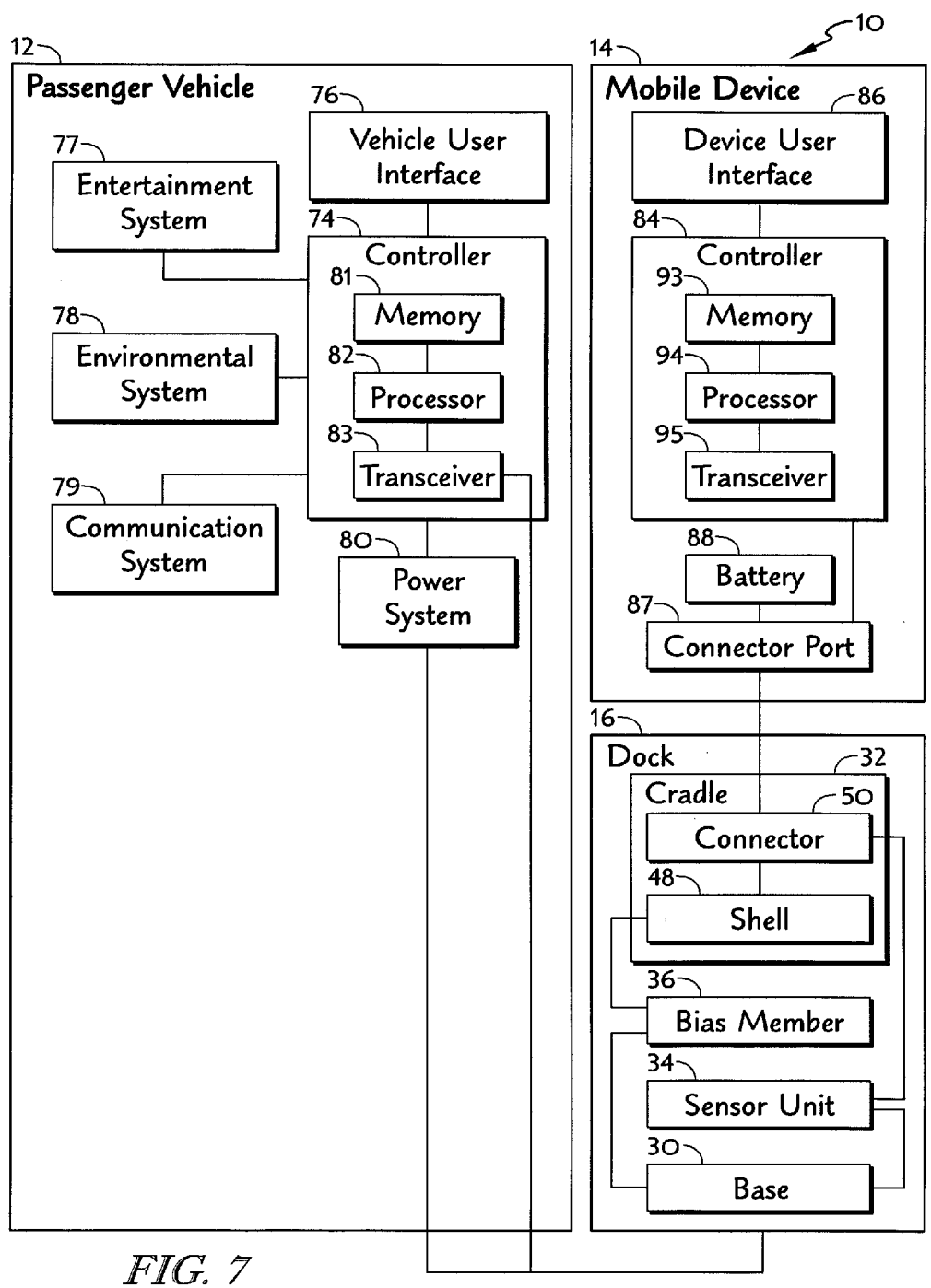
FIG. 7 is a diagrammatic view of the transportation system of FIGS. 1-6.

The cradle 32 illustratively includes a shell 48 and a connector 50 as shown in FIG. 2. The shell 48 forms the compartment 24 sized to receive a lower portion 54 of the mobile device 14 so that the cradle 32 moves with the mobile device 14 as shown in FIGS. 3-6. The connector 50 is illustratively coupled to the passenger vehicle 12 through the base 20 and provides data and power connections between the passenger vehicle 12, the mobile device 14, and the mobile device dock 16 as shown in FIG. 7.

In some embodiments, the cradle 32 may be interchangeable with alternative cradles (not shown) configured to receive and couple with different sizes and styles of mobile device 14. More particularly, different cradles 32 may form different sized compartments 24 and have different connectors 50 to accommodate different mobile devices 14.

In other embodiments, data and power connections may be wirelessly formed between the passenger vehicle 12, the mobile device 14, and the mobile device dock 16. Examples of wireless data protocols include Bluetooth, WiFi, or the like. Examples of wireless charging arrangements include inductive power coils or the like.

Figure 4:
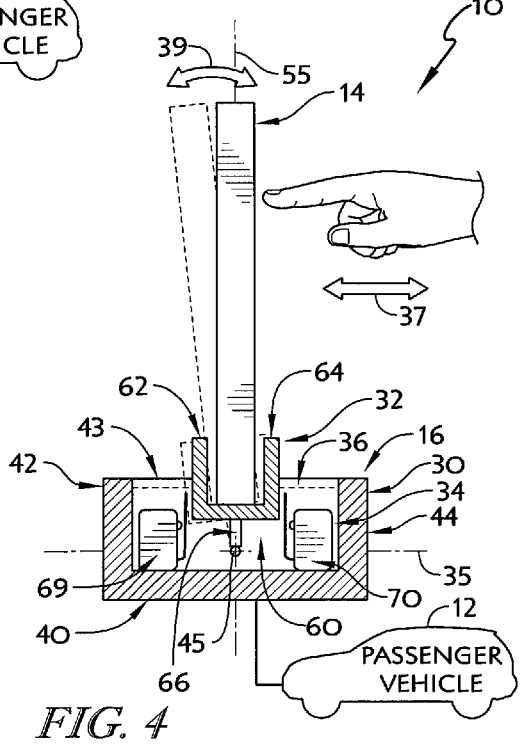
FIG. 4 is a partially diagrammatic side elevation view similar to FIG. 3 cut away to show that the sensor unit includes sensors configured to detect movement of the cradle about a y-axis in response to a user tapping the mobile device.

As shown in FIG. 2, the shell 48 supports the connector 50 so that the connector 50 is arranged to couple to the mobile device 14 when the mobile device 14 is received in the cradle 32. The shell 48 illustratively includes a lower panel 60, side panels 61, 62, 63, 64, and a support stem 66 as shown in FIGS. 3 and 4. The lower panel 60 of the shell 48 is supported above the floor 40 of the base 30. The side panels 61, 62, 63, 64 extend upwardly from the lower panel 60 to form the compartment 24. The support stem 66 extends downwardly from the lower panel 60 and defines a pivot point 65 about which the cradle 32 pivots relative to the base 30. The support stem 66 also contacts the floor 40 of the base 30 to stop movement of the cradle 32 along the z-axis 55 when a user presses down on the mobile device 14 as shown in FIG. 6.

The sensor unit 34 is coupled to the connector 50, as shown in FIG. 7, and is configured to send signals to the mobile device 14 through the connector 50 in response to movement of the cradle 32 relative to the base 30. The illustrative sensor unit 34 includes a plurality of sensors 67, 68, 69, 70, 71, 72, 73 arranged in the base cavity 46 between the shell 48 of the cradle 32 and the base 30 as shown in FIGS. 3-6. The sensors 67, 68, 69, 70, 71, 72, 73 are positioned to detect rotation or translation of the cradle 32 relative to the base 30 from a home position (shown in solid) to a plurality of input positions (shown in phantom) as suggested in FIGS. 3-6. In the illustrative embodiment, sensors 67, 68, 69, 70, 71, 72, 73 are each limit switches but in other embodiments could be one or more potentiometers, accelerometers, or other suitable sensor types.

Specifically, the sensors 67, 68 are arranged between the side panels 61, 63 of the cradle 32 and the side walls 41, 43 of the base 30, respectively, to detect movement of the cradle 32 relative to the base 30 about the x-axis 35 as shown in FIG. 3. The sensors 69, 70 are arranged between the side panels 62, 64 of the cradle 32 and the side walls 42, 44 of the base 30, respectively, to detect movement of the cradle 32 relative to the base 30 about the y-axis 45 as shown in FIG. 4. The sensors 71, 72 are arranged between the side panel 62 of the cradle 32 and the side wall 42 of the base 30 to detect movement of the cradle 32 about the z-axis 55 as shown in FIG. 5. The sensor 73 is arranged between the lower panel 60 of the cradle 32 and the floor 40 of the base 30 to detect movement of the cradle 32 along the z-axis as shown in FIG. 6.

The bias member 36 is illustratively shown in FIGS. 1 and 2 as an elastic flange arranged in the base cavity 46 and it extends from the side walls 41, 42, 43, 44 of the base 30 to the side panels 61, 62, 63, 64 of the cradle 32. Bias member 36 is elastic and biases the cradle 32 toward the home position (shown in solid) from each of the plurality of input positions (shown in phantom) as suggested in FIGS. 3-6. By biasing the cradle 32 toward the home position, the bias member 36 creates a haptic feedback force in a direction opposite of a user input force that moves the mobile device 14 and the cradle 32. The haptic feedback force is felt by a user applying the user input force to the mobile device 14 and the cradle 32 during movement of the cradle 16 from the home position to one of the input positions. The haptic feedback force also moves the cradle 32, along with the mobile device 14, back to the home position from the input positions when the user input force is removed. In other embodiments, bias member 36 may be made up of one or more coil springs, leaf springs, and/or elastic elements that interconnect the cradle 32 with the base 30.

In operation, the sensor unit 34 detects and sends signals to the mobile device 14 in response to a user pushing the mobile device 14 as suggested by arrows 27, 37, 47, and 57 so that the mobile device 14 and the cradle 32 rotate or translate from the home position to an input position as suggested in FIGS. 3-6. The bias member 36 then creates a return force in response to rotation or translation of the mobile device 14 and the cradle 32 so that the mobile device 14 and cradle 32 move back to the home position when the user releases the mobile device 14 as suggested by arrow 39 in FIG. 3. The motion of the mobile device 14 and the cradle 32 along with the return force applied by the bias member 36 provide motion and force haptic feedback to the user pushing the mobile device 14 so that the user can feel that she has successfully sent a signal to the mobile device 14.

The illustrative passenger vehicle 12 is shown to include a controller 74, a vehicle user interface 76, a plurality of auxiliary systems 77, 78, 79, and a power system 80 as shown diagrammatically in FIG. 7. The controller 74 is coupled to the vehicle user interface 76, the auxiliary systems 77, 78, 79, and the power system 80. The vehicle user interface 76 includes a plurality of buttons, knobs, and screens (not shown) configured to allow a user to control the auxiliary systems of the vehicle 12. The power system 80 is configured to provide power to the controller 74, the vehicle user interface 76, the auxiliary systems 77, 78, 79, and to vehicle accessories such as the mobile device 14 and the mobile device dock 16 as shown in FIG. 7.

The auxiliary systems 77, 78, 79 are illustratively an entertainment system 77 (sometimes referred to as an infotainment system), an environmental system 78, a communication system 79 as shown in FIG. 7. In other embodiments, more or fewer auxiliary systems may be included in the passenger vehicle 12. The entertainment system 77 is configured to provide entertainment to a user and may include a stereo, video screens, and the like (not shown). The environmental system 78 is configured to influence the environment inside the passenger vehicle 12 and includes a heater, an air conditioner, seat heaters/coolers, and the like (not shown). The communication system 79 is configured to provide lines of communication from the passenger vehicle 12 to outside networks including internet, GPS, and voice connections (not shown).

The controller 74 of the passenger vehicle 12 illustratively includes a memory 81, a processor 82, and a transceiver 83 as shown in FIG. 7. The memory 81 includes instructions corresponding to processes. The processor 82 is coupled to the memory to execute the instructions held in the memory 81. The transceiver 83 is coupled to the processor 82 and is configured to transmit information from and receive information for the processor 82.

The mobile device 14 is illustratively a mobile phone but in other embodiments may be a music player, a PDA, a tablet computer, or the like. The mobile device 14 may communicate with the passenger vehicle 12 to provide input to and control the auxiliary systems 77, 78, 79 of the passenger vehicle 12. For example, the mobile device 14 may provide music or video input to the entertainment system 77, temperature profile input to the environmental system, and/or email or voice input to the communication system 79.

The illustrative mobile device includes a controller 84, a device user interface 86, a connector port 87, and a battery 88 as shown diagrammatically in FIG. 7. The controller 84 is coupled to the device user interface 86 and the connector port 87. The device user interface 86 includes a touch-screen display 90 and a home button 92 configured to receive inputs from a user and to display information to the user as shown in FIG. 2. The connector port 87 is coupled between the connector 50 of the mobile device dock 16, the controller 84 of the mobile device 14, and the battery 88 of the mobile device 14. The battery 88 powers the mobile device 14.

The controller 84 of the mobile device 14 illustratively includes a memory 93, a processor 94, and a transceiver 95 as shown in FIG. 7. The memory 93 includes instructions corresponding to processes. The processor 94 is coupled to the memory to execute the instructions held in the memory 93. The transceiver 95 is coupled to the processor 94 and is configured to transmit information from and receive information for the processor 94.

The connector port 87 provides a wired power connection from the power system 80 of the passenger vehicle 12 to the battery 88 of the mobile device 14 through the mobile device dock 16 as shown in FIG. 7. The connector port 87 also provides a communication connection to the controller 84 of the mobile device 14 from the controller 74 of the passenger vehicle 12 and from the sensor unit 34 of the mobile device dock 16. More specifically, the transceiver 83 included in the passenger vehicle 12 is connected for communication with the transceiver 95 included in the mobile device 14 through the mobile device dock 16 when the connector 50 of the mobile device dock 16 is coupled to the connector port 87 of the mobile device 14 as shown in FIG. 7. Similarly, the sensor unit 34 of the mobile device dock 16 is connected for communication with the transceiver 95 included in the mobile device 14 when the connector 50 of the mobile device dock 16 is coupled to the connector port 87 of the mobile device 14 as shown in FIG. 7.

Figure 8:
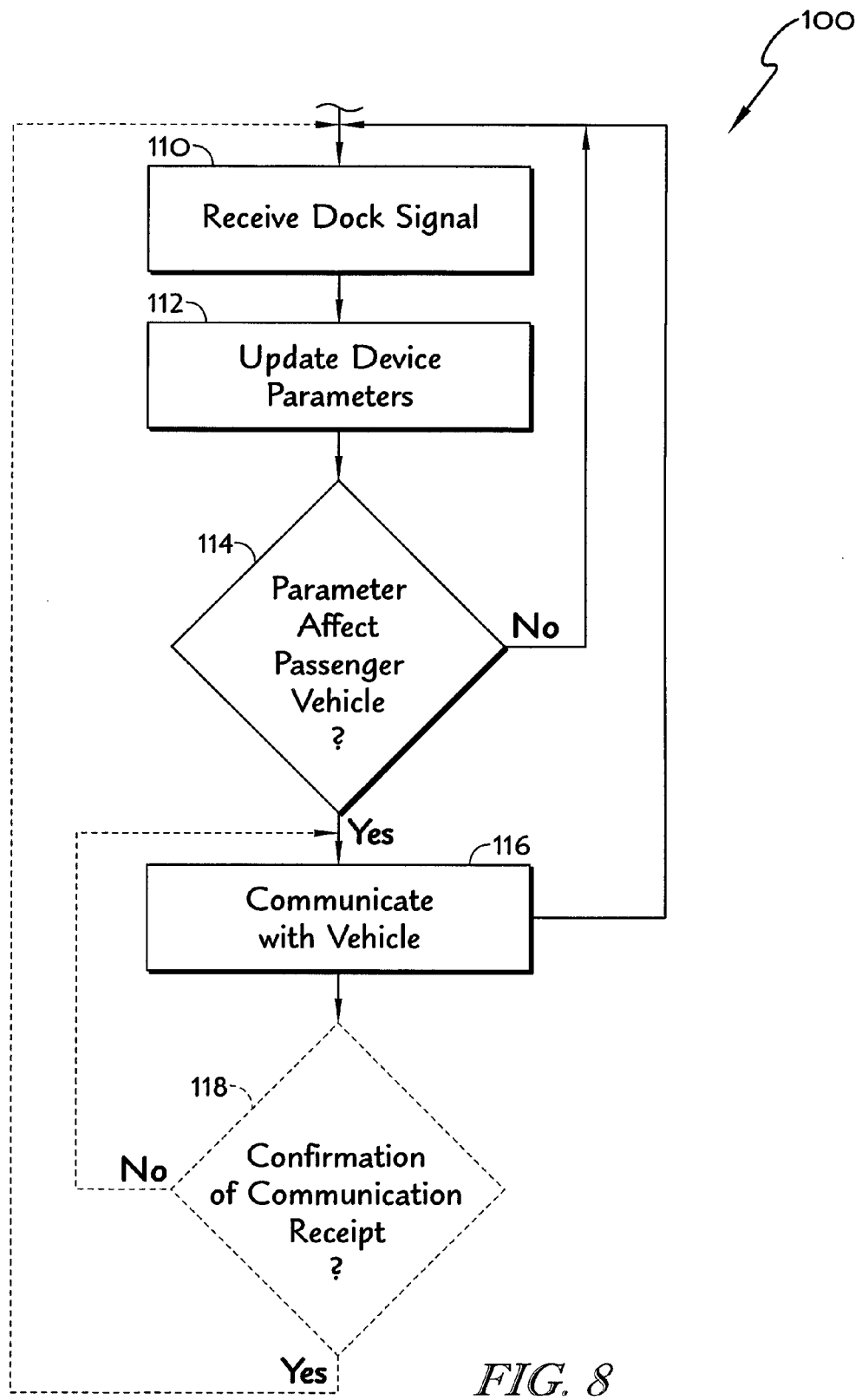
FIG. 8 is a flow chart showing an algorithm performed by the mobile device during operation of the transportation system.

An illustrative process 100 to be performed by the controller 84 of the mobile device 14 when the mobile device 14 is coupled to the mobile device dock 16 is shown in FIG. 8. In the illustrative embodiment, the controller 84 is configured to launch an application including the process 100 when the mobile device, 14 determines that it is in communication with the passenger vehicle 12. In other embodiments, the controller 84 is configured to launch an application including the process 100 when an input, such as an input corresponding to downward translation of the cradle 32 relative to the base 30, is received from the mobile device dock 16.

The process 100 begins with a step 110 in which the controller 84 receives a signal from the mobile device dock 32. The signal is generated by the sensor unit 34 in response to movement of the cradle 32 relative to the base 30 via rotation or translation as shown, for example, in FIGS. 3-6. When the signal is received by the controller 84, the controller 84 updates one or more parameters of the mobile device 14 in a step 112. Illustrative parameters that may be updated include music track playing, music volume, desired environment temperature, voice call accept/deny, voice call volume, email/voicemail message to be read, or the like.

After the parameter has been updated in the mobile device 14, the controller 84 determines in a decision step 114 if the updated parameter affects an input or control related to the passenger vehicle 12. If the updated parameter does not affect the passenger vehicle 12, then the controller 84 loops back around to wait for another signal from the mobile device dock 16. If the updated parameter does affect the passenger vehicle 12, then the controller 84 of the mobile device 14 communicates with the controller 74 of the passenger vehicle 12 through the mobile device dock 16 to update the input or control sent to the passenger vehicle 12 in a step 116. The controller 84 then loops back around to wait for another signal from the mobile device dock 16.

Alternatively, in some embodiments, the controller 84 may proceed to a decision step 118 after communicating with the passenger vehicle 12 in step 116. In decision step 118, controller 84 of the mobile device 14 checks to see if confirmation of communication receipt is received from the passenger vehicle 12. If the confirmation is not received, then the controller 84 loops back and repeats its communication to the passenger vehicle 12 in step 116. If the confirmation is received, then the controller 84 loops back around to wait for another signal from the mobile device dock 16.

In other embodiments, the mobile device dock 16 may be used with the mobile device 14 as an interface with other secondary devices such as a stereo, a computer, a television, or other pieces of equipment. In such embodiments, the mobile device dock 16 cooperates with the mobile device 14 and the secondary device to form a system that operates in a manner similar to the transportation system 10 described above.

Figure 9:
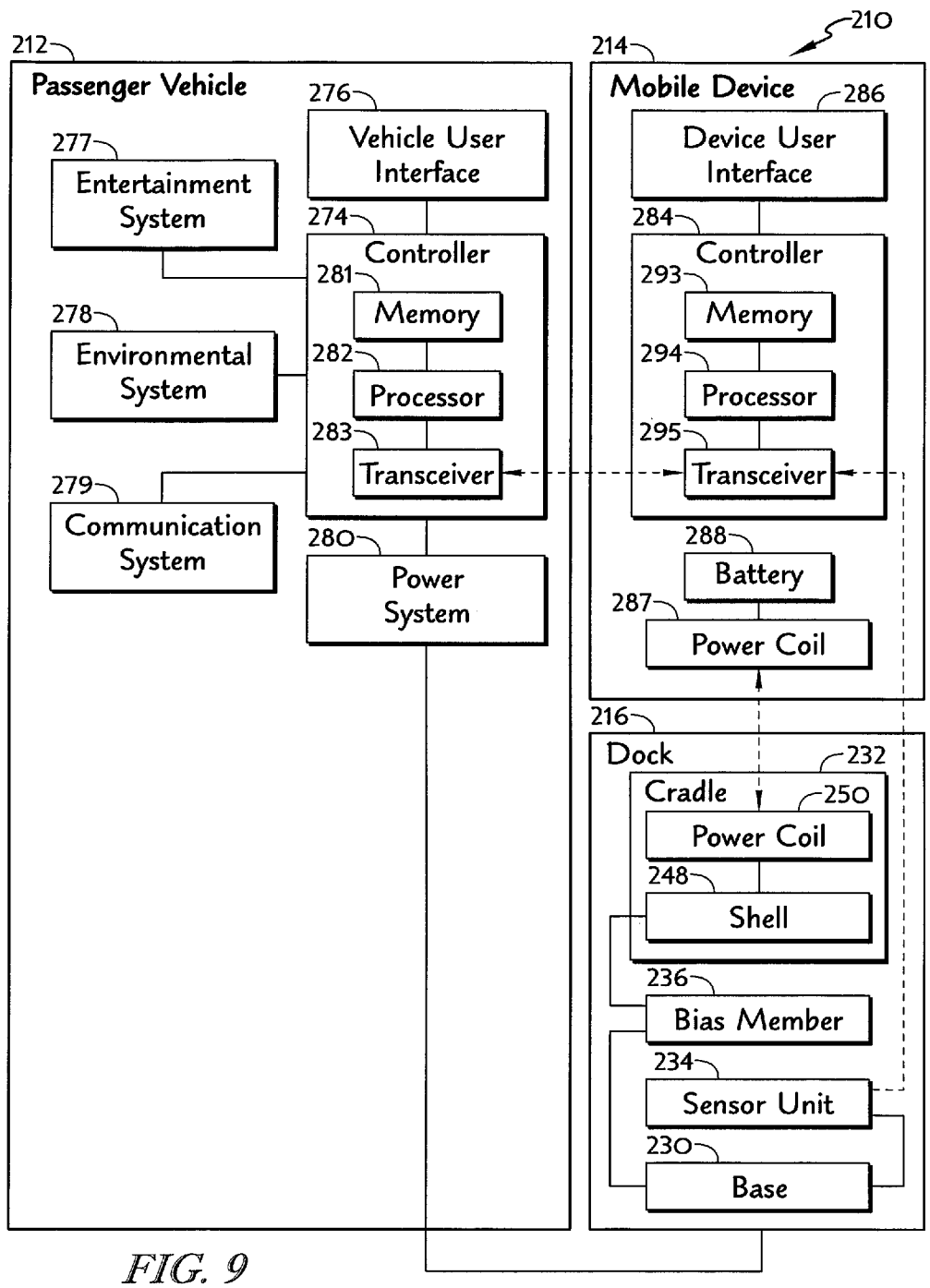
FIG. 9 is a diagrammatic view of a first alternative transportation system.

Another illustrative transportation system 210 is shown diagrammatically in FIG. 9. The transportation system 210 is substantially similar to the transportation system 10 shown in FIGS. 1-7 and described herein. Additionally, the transportation system 210 is configured to perform the process 100 shown in FIG. 8. Accordingly, similar reference numbers in the 200 series indicate features that are common between the transportation system 10 and the transportation system 210. The description of the transportation system 10 is hereby incorporated by reference to apply to the transportation system 210, except in instances when it conflicts with the specific description and drawing of the transportation system 210 herein.

Unlike the transportation system 10, the transportation system 210 is configured to provide wireless data and power connections between the mobile device 214 and the mobile device dock 216 as suggested in FIG. 9. Wireless connection of the mobile device 14 to the mobile device dock 216 allows various mobile devices 214 to be used with the mobile device dock 216 without changing a connector included in the mobile device dock 216 to accommodate different connection ports included in the mobile devices 214. Additionally, a wireless data connection is formed between the transceiver 283 of the passenger vehicle 212 and the transceiver 295 of the mobile device 214 to facilitate communication between the passenger vehicle 212 and the mobile device 214 as shown in FIG. 9.

To facilitate the wireless data connection, the sensor unit 234 of the mobile device dock 216 is configured to generate a wireless signal in response to movement of the cradle 232 relative to the mobile device dock 216. The wireless signal is received by the transceiver 295 of the mobile device 214 as suggested in FIG. 9.

To facilitate the wireless power connection, the mobile device 214 includes an inductive power coil 287 and the mobile device dock 216 includes an inductive power coil 250 that transfers power from the passenger vehicle 212 to the mobile device 214 as suggested in FIG. 9. The inductive power coil 287 of the mobile device 214 is coupled to the battery 288 of the mobile device 214. The inductive power coil 250 of the mobile device dock 216 is coupled to the shell 248 of the cradle 232 and is arranged to be near the inductive power coil 250 of the mobile device 214 when the mobile device 214 is received in the shell 248. The inductive power coil 250 of the mobile device dock 216 is coupled to the power system 280 of the passenger vehicle 212 through the base 230 of the mobile device dock 216 and transfers power from the power system 280 to the mobile device 214 as suggested in FIG. 9.

Figure 10:
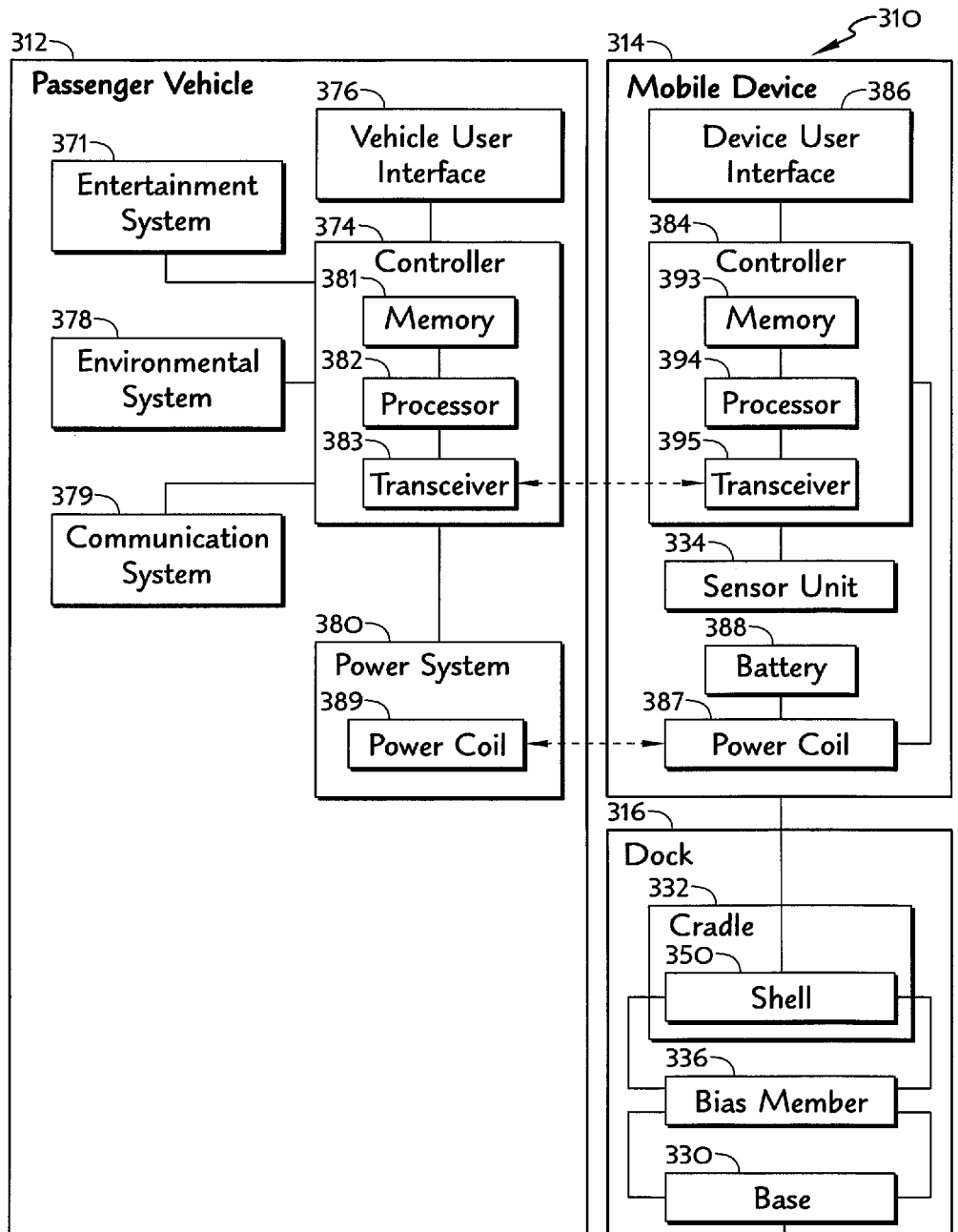
FIG. 10 is a diagrammatic view of a second alternative transportation system.

Another illustrative transportation system 310 is shown diagrammatically in FIG. 10. The transportation system 310 is substantially similar to the transportation system 10 shown in FIGS. 1-7 and described herein. Accordingly, similar reference numbers in the 300 series indicate features that are common between the transportation system 10 and the transportation system 310. The description of the transportation system 10 is hereby incorporated by reference to apply to the transportation system 310, except in instances when it conflicts with the specific description and drawing of the transportation system 310.

Unlike the transportation system 10, the mobile device dock 316 of the transportation system 310 does not provide data or power connections between the passenger vehicle 312 and the mobile device 314 as shown in FIG. 10. Rather, data and power connections are formed directly between the passenger vehicle 312 and the mobile device 314.

To facilitate the data connection between the passenger vehicle 312 and the mobile device 314 without passing data through the mobile device dock 316, a sensor unit 334 is included in the mobile device 314 as shown in FIG. 10. The sensor unit 334 is configured to generate a signal in response to movement of the mobile device 314 in a manner consistent with movement of the cradle 332 relative to the base 330. In the illustrative embodiment, the sensor unit 334 includes a plurality of accelerometers (not shown). Additionally, a wireless data connection is formed between the transceiver 383 of the passenger vehicle 312 and the transceiver 395 of the mobile device 314 to allow communication between the passenger vehicle 312 and the mobile device 314 as shown in FIG. 10.

To facilitate the power connection between the passenger vehicle 312 and the mobile device 314 without passing data from the mobile device dock 316, the mobile device 314 includes an inductive power coil 387 and the passenger vehicle 312 includes an inductive power coil 389 as shown in FIG. 10. The inductive power coil 387 of the mobile device 314 is coupled to the battery 388 of the mobile device 314. The inductive power coil 389 of the passenger vehicle 312 is included in the power system 380 of the passenger vehicle 312 and transfers to the mobile device 314 as suggested in FIG. 10.

In operation, the transportation system 310 is configured to perform the process 100; however in step 110, the signal is not received from a sensor unit included in the mobile device dock 316. Rather, the signal is received from the sensor unit 334 included in the mobile device 314 as suggested in FIG. 10.

Disclosed embodiments provide a solution to the technical problem that using mobile devices in automotive environments can be difficult and can divert attention from other tasks performed while travelling. The use of mobile devices (e.g., smart phones, MP3 players, PDAs, tablet computers, etc.) has become common for automobile drivers and passengers making calls and listening to music. Because such devices are highly portable, have a rich feature set, and are increasingly being integrated into automotive systems, use by drives and passengers will likely continue and expand in automotive environments.

Some such mobile devices include smooth-surface touch-screen displays that both convey information to and receive information from a user. Using touch-screen displays often require a user to look at the display to interact with the mobile device, which diverts visual attention from other tasks performed while travelling, e.g. driving.

Further, such mobile devices are sometimes limited in their ability to provide haptic feedback to a user interacting with the mobile device via the touch-screen display. Generally haptic feedback provided by mobile devices in response to interaction with a touch-screen display is limited to providing audio feedback (a "click" sound) or vibration of the entire handheld device. Force and touch feedback is therefore limited to functions of the mobile device associated with physical buttons included in the handheld device (which are generally minimized in many current handheld devices).

Accordingly, disclosed embodiments offer a solution to this technical problem by providing the ability for a user, e.g.; driver or passenger, to effectively use, control, and/or interact with the mobile device in the automotive environment while minimizing the need to visually interact with the mobile device.

Furthermore, disclosed embodiments also provide a solution for the technical problem that integrated user interfaces included in mobile devices used to interact with and/or control various functions within an automotive environment, e.g., a car stereo, or infotainment platform give indirect tactile feedback to a user. Conventionally, car stereos, infotainment platforms, and other auxiliary systems include user inputs that provide haptic feedback in the form of force and touch feedback to a user operating the systems. Further, such conventional automotive auxiliary systems typically include buttons, switches, and/or knobs that are positioned in a standard, stationary location in a vehicle, which provide a consistent highly tactile button press, switch pivot, or knob rotation feel. Accordingly, the disclosed embodiments provide a mobile device dock 16 included in the transportation system 10 described herein that similarly provides force and touch haptic feedback in response to user interaction with the mobile device 14 so as to enable control and interaction with both functionality of the mobile device 14 and/or the automotive environment auxiliary systems 77, 78, 79.

The invention claimed is:

1. A mobile device dock comprising
   a base,
   a cradle formed to include a compartment sized to receive a mobile device, the cradle coupled to the base for movement from a home position to a first input position relative to the base in response to a user input force being applied to the cradle,
   a sensor unit coupled to the base and configured to detect movement of the cradle from the home position to the first input position, and
   return means for creating a haptic feedback force, opposite the user input force, in response to the user input force being applied to the cradle so that a user applying the user input force feels the haptic feedback force during movement of the cradle from the home position to the first input position and so that the cradle moves back to the home position from the first input position when the user input force is removed from the cradle.

2. The mobile device dock of claim 1, wherein the return means includes a bias member coupled to the base and to the cradle.

3. The mobile device dock of claim 2, wherein the base includes a floor and a plurality of side walls arranged to extend up from the floor to form a base cavity, and the bias member is arranged inside the base cavity.

4. The mobile device dock of claim 3, wherein the cradle includes a lower panel and a plurality of side panels arranged to extend up from the lower panel to form the compartment, and the bias member extends from at least one of the side walls of the base to at least one of the side panels of the cradle.

5. The mobile device dock of claim 4, wherein the bias member includes an elastic flange that extends from the side walls of the base to the side panels of the cradle.

6. The mobile device dock of claim 1, wherein the cradle is coupled to the base for movement about a first pivot axis, and the cradle rotates about the first pivot axis to move from the home position to the first input position.

7. The mobile device dock of claim 6, wherein the cradle is coupled to the base for movement along a translation axis, the cradle slides along the translation axis from the home position to a second input position, and the sensor unit is configured to detect movement of the cradle from the home position to the second input position.

8. The mobile device dock of claim 7, wherein the bias member is coupled to the base and to the cradle and is arranged to bias the cradle to the home position from the second input position to the home position.

9. The mobile device dock of claim 6, wherein the cradle is coupled to the base for movement about a second pivot axis, orthogonal to the first pivot axis, the cradle rotates about the second pivot axis from the home position to a second input position, and the sensor unit is configured to detect movement of the cradle from the home position to the second input position.

10. The mobile device dock of claim 9, wherein the cradle is coupled to the base for movement about a third pivot axis, orthogonal to the first pivot axis and to the second pivot axis, the cradle rotates about the third pivot axis from the home position to a third input position, and the sensor unit is configured to detect movement of the cradle from the home position to the third input position.

11. A mobile device dock comprising
    a base to be coupled to a passenger vehicle,
    a cradle formed to include a compartment sized to receive a mobile device and coupled to the base for movement from a home position to a first input position, and
    a sensor unit that is coupled to the base,
    wherein the sensor unit is configured to detect movement of the cradle from the home position to the first input position and to generate a first signal in response to movement of the cradle from the home position to the first input position.

12. The mobile device dock of claim 11, wherein the cradle is biased toward the home position to create haptic feedback in response to movement of the cradle between the home position and the first input position.

13. The mobile device dock of claim 11, wherein the cradle is coupled to the base for movement to a second input position.

14. The mobile device dock of claim 13, wherein the sensor is configured to detect movement of the cradle to the second input position and to generate a second signal in response to movement of the cradle to the second input position.

15. The mobile device dock of claim 14, wherein the cradle is coupled to the base for movement about a first pivot axis relative to the base.

16. The mobile device dock of claim 15, wherein the cradle is coupled to the base for movement about a second pivot axis, orthogonal to the first pivot axis, relative to the base.

17. The mobile device dock of claim 15, wherein the cradle moves about the first pivot axis to move between the home position, the first input position, and the second input position.

18. The mobile device dock of claim 17, wherein the cradle moves in a first direction about the first pivot axis from the home position to the first input position.

19. The mobile device dock of claim 18, wherein the cradle moves in a second direction, opposite the first direction, about the first pivot axis from the home position to the second input position.

20. The mobile device dock of claim 11, wherein the cradle is coupled to the base for movement along a translation axis relative to the base.

21. The mobile device dock of claim 20, wherein the home position and the first input position are spaced apart along the translation axis.

22. The mobile device dock of claim 21, wherein the cradle is coupled to the base for movement to a second input position.

23. The mobile device dock of claim 22, wherein the sensor unit is configured to detect movement of the cradle to the second input position and to generate a second signal in response to movement of the cradle to the second input position.

24. The mobile device dock of claim 23, wherein the cradle is coupled to the base for movement about a first pivot axis relative to the base.

25. The mobile device dock of claim 24, wherein the cradle moves about the first pivot axis to move between the home position and the second input position.

26. The mobile device dock of claim 25, wherein the translation axis is orthogonal to the first pivot axis.

27. The mobile device dock of claim 25, wherein the translation axis is parallel to the first pivot axis.

28. The mobile device dock of claim 27, wherein the translation axis is collinear with the first pivot axis.

29. A mobile device dock comprising
a base to be coupled to a passenger vehicle,
a cradle formed to include a compartment sized to receive a mobile device and coupled to the base for movement relative to the base from a home position to a first input position in response to a force being applied to the cradle, and
a bias element coupled to the base and to the cradle to bias the cradle toward the home position.

30. The mobile device dock of claim 29, wherein the cradle is coupled to the base for movement from the home position to the first input position via rotation about a first pivot axis.

31. The mobile device dock of claim 30, wherein the cradle is coupled to the base for movement from the home position to a second input position via rotation about a second pivot axis orthogonal to the first pivot axis.

32. The mobile device dock of claim 31, wherein the cradle is coupled to the base for movement from the home position to a third input position via rotation about a third pivot axis that is orthogonal to the first pivot axis and to the second pivot axis.

33. The mobile device dock of claim 32, wherein the cradle is coupled to the base for movement from the home position to a fourth input position via translation along a translation axis.

34. The mobile device dock of claim 33, further comprising a sensor unit coupled to the base and configured to detect movement of the cradle to one of the first input position, the second input position, the third input position, and the fourth input position.

35. The mobile device dock of claim 29, wherein the cradle is coupled to the base for movement from the home position to the first input position via translation along a translation axis.

36. The mobile device dock of claim 35, wherein the cradle is coupled to the base for movement from the home position to a second position via rotation about a first pivot axis.

37. The mobile device dock of claim 36, wherein the cradle is coupled to the base for movement from the home position to a third input position via rotation about a second pivot axis orthogonal to the first pivot axis.

38. The mobile device dock of claim 36, wherein the translation axis is parallel to the first pivot axis and is orthogonal to the second pivot axis.

39. The mobile device dock of claim 38, wherein the translation axis is collinear with the first pivot axis.

40. A transportation system comprising
a mobile device dock including a base, a cradle coupled to the base for movement from a home position to a first input position, and a sensor unit coupled to the base, and
and a mobile device received in the cradle and coupled to the sensor unit for communication with the sensor unit,
wherein the sensor unit is configured to detect movement of the cradle from the home position to the first input position and to send a first signal to the mobile device in response to movement of the cradle from the home position to the first input position.

41. The transportation system of claim 40, wherein the cradle is biased toward the home position to create haptic feedback in response to movement of the cradle.

42. The transportation system of claim 41, wherein the cradle is coupled to the base for movement about a first pivot axis relative to the base, and the cradle moves about the first pivot axis to move between the home position and the first input position.

43. The transportation system of claim 41, wherein the cradle is coupled to the base for movement along a translation axis relative to the base, and the cradle moves along the translation axis to move between the home position and the first input position.

44. The transportation system of claim 41, further comprising an auxiliary vehicle system including a device, a controller coupled to the device, and a transceiver coupled to the controller and in communication with the mobile device.

* * * * *